(12) United States Patent
Okuno et al.

(10) Patent No.: US 10,400,954 B2
(45) Date of Patent: Sep. 3, 2019

(54) GAS FILLING SYSTEM

(71) Applicant: Kobe Steel, Ltd., Hyogo (JP)

(72) Inventors: Takashi Okuno, Takasago (JP); Kenji Nagura, Takasago (JP); Hitoshi Takagi, Takasago (JP); Takuro Uba, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 145 days.

(21) Appl. No.: 15/550,291

(22) PCT Filed: Feb. 16, 2016

(86) PCT No.: PCT/JP2016/054390
§ 371 (c)(1),
(2) Date: Aug. 10, 2017

(87) PCT Pub. No.: WO2016/133068
PCT Pub. Date: Aug. 25, 2016

(65) Prior Publication Data
US 2018/0023764 A1    Jan. 25, 2018

(30) Foreign Application Priority Data
Feb. 20, 2015    (JP) .................... 2015-031189

(51) Int. Cl.
*F17C 5/06*    (2006.01)

(52) U.S. Cl.
CPC ........ *F17C 5/06* (2013.01); *F17C 2205/0142* (2013.01); *F17C 2205/0323* (2013.01);
(Continued)

(58) Field of Classification Search
CPC ............... F17C 5/06; F17C 2205/0142; F17C 2205/0323; F17C 2221/012;
(Continued)

(56) References Cited

U.S. PATENT DOCUMENTS 3,719,196 A * 3/1973 McJones .............. F17B 1/12
137/110
3,807,422 A    4/1974 McJones
(Continued)

FOREIGN PATENT DOCUMENTS

JP    1992-064700 U    6/1992
JP    H08-109999 A    4/1996
(Continued)

OTHER PUBLICATIONS

International Search Report issued in PCT/JP2016/054390; dated May 24, 2016.
(Continued)

*Primary Examiner* — Timothy L Maust
(74) *Attorney, Agent, or Firm* — Studebaker & Brackett PC

(57) ABSTRACT

A gas delivery system including: a feeder for feeding a gas to a tank; a pressure storage container unit which has a plurality of pressure storage containers, and sends out the gas to the feeder; a gas supply unit; and a controller. The controller implements a storing operation that a specified pressure storage among the plurality of pressure storage containers is supplied with the gas until a pressure of the specified pressure storage container reaches a reference pressure or greater, after finish of a delivery of the gas to one tank carrier, and a sending operation that the gas is sent out from another pressure storage container except the specified pressure storage container to the feeder, and then sent out from the specified pressure storage container to the feeder on a receipt of a shift indication from the feeder, at a delivery of the gas to a subsequent tank carrier.

6 Claims, 7 Drawing Sheets

(52) U.S. Cl.
CPC ............... *F17C 2221/012* (2013.01); *F17C 2223/0123* (2013.01); *F17C 2227/0157* (2013.01); *F17C 2227/0337* (2013.01); *F17C 2227/043* (2013.01); *F17C 2250/03* (2013.01); *F17C 2250/0689* (2013.01); *F17C 2250/075* (2013.01); *F17C 2260/025* (2013.01); *F17C 2265/063* (2013.01); *F17C 2265/065* (2013.01); *Y02E 60/321* (2013.01)

(58) Field of Classification Search
CPC ...... F17C 2223/0123; F17C 2227/0157; F17C 2227/0337; F17C 2250/03; F17C 2265/063; F17C 2265/065
USPC .................................................. 141/4, 5, 98
See application file for complete search history.

(56) References Cited

U.S. PATENT DOCUMENTS

| | | | |
|---|---|---|---|
| 3,837,377 A | 9/1974 | McJones | |
| 6,904,944 B2* | 6/2005 | Satou | F17C 5/00 141/100 |
| 9,284,178 B2* | 3/2016 | Donnelly | B67D 7/04 |
| 9,714,739 B2* | 7/2017 | Killeen | F17D 3/00 |
| 9,772,068 B2* | 9/2017 | Mrowzinski | F17C 5/007 |
| 9,845,917 B2* | 12/2017 | Allidieres | F17C 5/007 |
| 9,933,114 B2* | 4/2018 | Thiessen | F17C 5/06 |
| 2003/0209282 A1 | 11/2003 | Satou et al. | |
| 2014/0332114 A1 | 11/2014 | Nagura et al. | |

FOREIGN PATENT DOCUMENTS

| | | |
|---|---|---|
| JP | 2003-336795 A | 11/2003 |
| JP | 2004-076895 A | 3/2004 |
| JP | 2004-293752 A | 10/2004 |
| JP | 2008-064160 A | 3/2008 |
| JP | 2010-144771 A | 7/2010 |
| JP | 2011-074925 A | 4/2011 |
| JP | 2013-130218 A | 7/2013 |

OTHER PUBLICATIONS

Notification of Transmittal of Translation of the International Preliminary Report on Patentability (Chapter I) and Translation of Written Opinion of the International Searching Authority; PCT/JP2016/054390; dated Aug. 31, 2017.

The extended European search report issued by the European Patent Office dated Jul. 26, 2018, which corresponds to European Patent Application No. 16752454.5-1010 and is related to U.S. Appl. No. 15/550,291.

* cited by examiner

GAS FILLING SYSTEM

TECHNICAL FIELD

The present invention relates to a gas delivery system

BACKGROUND ART

Recently, a fuel cell vehicle or a vehicle utilizing hydrogen gas, which is simply referred to as "vehicle" hereinafter, is being developed. Along with this development, a hydrogen station for feeding hydrogen gas to a tank of a vehicle is also being developed. For example, Patent Literature 1 discloses a hydrogen station including a pressure storage bank unit having a plurality of pressure storage banks, a compressor for supplying compressed hydrogen gas to the respective pressure storage banks, a coupler used to feed the hydrogen gas from the pressure storage banks to a chamber (i.e., tank) of a vehicle, and a controller for controlling the feeding order of hydrogen gas to the chamber of the vehicle from the pressure storage banks. The controller allows a specified pressure storage bank to feed the hydrogen gas to the chamber of the vehicle, and then allows another pressure storage bank having a higher pressure than the specified pressure storage bank to feed the hydrogen gas to the chamber of the vehicle when a pressure difference between the pressure of the specified pressure storage bank and the pressure of the chamber of the vehicle reaches a predetermined value or greater. In other words, the controller shifts the pressure storage banks one after another to feed the hydrogen gas to the chamber of the vehicle in accordance with a pressure difference between a pressure of each pressure storage bank and a pressure of the chamber of the vehicle.

Meanwhile, recently, in addition to reduction in the delivery time of hydrogen gas to a vehicle to not more than three minutes, it is being demanded to shorten the time from the finish of a hydrogen gas delivery to a first vehicle to the start of a hydrogen gas delivery to a second vehicle. However, in the hydrogen station shown in Patent Literature 1, after the hydrogen gas delivery to a first vehicle is finished, hydrogen gas is usually supplied from the compressor to each pressure storage bank to fully charge or fill all the pressure storage banks with hydrogen gas, and a hydrogen gas delivery to a second vehicle is thereafter started. Therefore, it will be seen to require a long time to start the delivery to the second vehicle after the finish of the delivery to the first vehicle. This problem becomes bigger as the number of vehicles increases.

CITATION LIST

Patent Literature

Patent Literature 1 Japanese Unexamined Patent Publication No. 2008-064160

SUMMARY OF INVENTION

The present invention has been made in view of the aforementioned problem, and an object of the present invention is to shorten the gas delivery time to a plurality of tank carriers.

A gas delivery system according to one aspect of the present invention is a gas delivery system for delivering a gas to a tank carrier including a tank, including: a feeder for feeding the gas to the tank of the tank carrier; a pressure storage container unit which has a plurality of pressure storage containers for storing the gas, and sends out the gas to the feeder; a gas supply unit for supplying the gas to the pressure storage container unit; and controller for controlling execution of the gas supply unit and the sending of the gas from the pressure storage container unit, wherein the controller implements a storing operation that a specified pressure storage container among the plurality of pressure storage containers is supplied with the gas until a pressure of the specified pressure storage container reaches a reference pressure or greater, after finish of a delivery of the gas to one tank carrier, and a sending operation that the gas is sent out from another pressure storage container except the specified pressure storage container to the feeder, and then sent out from the specified pressure storage container to the feeder after shifting from the another pressure storage container to the specified pressure storage container on receipt of a shift indication from the feeder, at a delivery of the gas to a subsequent tank carrier.

Moreover, a gas delivery system according to another aspect of the present invention is a gas delivery system for delivering a gas to a tank carrier including a tank, including: a feeder for feeding the gas to the tank of the tank carrier; a pressure storage container unit which has a plurality of pressure storage containers for storing the gas, and sends out the gas to the feeder; a gas supply unit for supplying the gas to the pressure storage container unit; and a controller for controlling execution of the gas supply unit and the sending of the gas from the pressure storage container unit, wherein the controller implements a storing operation that a specified pressure storage container among the plurality of pressure storage containers is supplied with the gas until a pressure of the specified pressure storage container reaches a reference pressure or greater, and the other pressure storage containers than the specified pressure storage container are supplied with the gas while keeping less than the reference pressure or greater, after finish of a delivery of the gas to one tank carrier, and a sending operation that the gas is sent out from another pressure storage container except the specified pressure storage container to the feeder, and then sent out from the specified pressure storage container to the feeder after shifting from the another pressure storage container to the specified pressure storage container on receipt of a shift indication from the feeder, at a delivery of the gas to a subsequent tank carrier.

DESCRIPTION OF EMBODIMENTS

Figure 1:
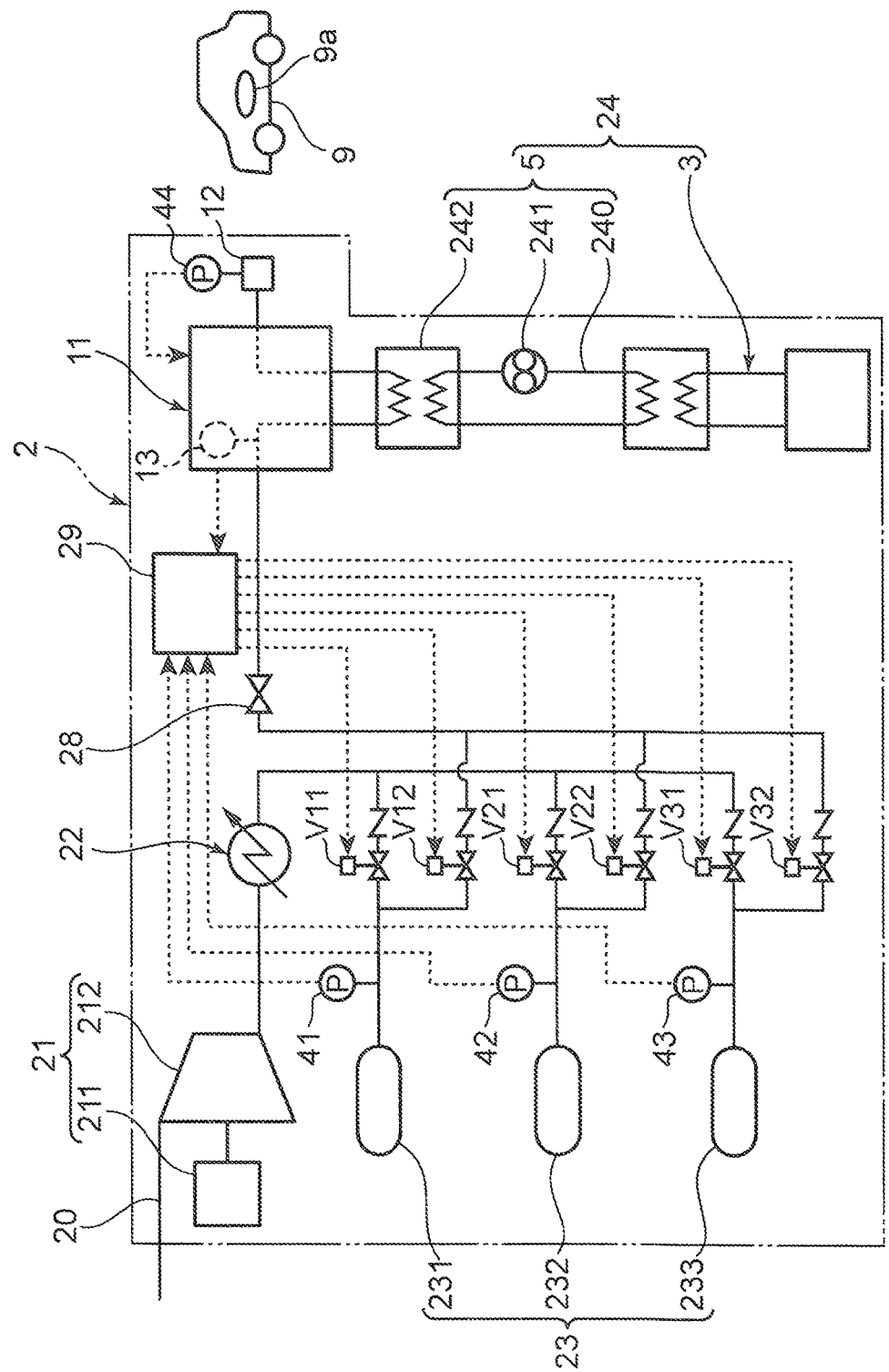
FIG. 1 shows a hydrogen station according to an embodiment of the present invention.

FIG. 1 shows a hydrogen station 2 which is a gas delivery system according to an embodiment of the present invention. The hydrogen station 2 delivers hydrogen to a vehicle 9 such as a fuel cell vehicle. The hydrogen station 2 includes a gas flow way 20, a compressor unit 21 serving as a gas supply unit, a gas cooler 22, a pressure storage container unit 23, a precooling system 24, a dispenser 11 serving as a feeder, and a controller 29. The compressor unit 21, a part of the gas cooler 22, and the pressure storage unit 23 are on the gas flow way 20. The gas flow way 20 allows the hydrogen to flow to the dispenser 11.

The compressor unit 21 is of a reciprocating type, and includes a driving part 211 and a compressing part 212. The compressing part 212 has a piston and a cylinder, and compresses the hydrogen in the cylinder by the piston driven by a driving power from the driving part 211. Further, the cylinder of the compressing part 212 is supplied with hydrogen from an unillustrated gas supply source.

The gas cooler 22 is at a downstream position of the compressor unit 21 on the gas flow way 20, and cools the hydrogen discharged from the compressing part 212 of the compressor unit 21.

The pressure storage container unit 23 has a plurality of pressure storage containers. In this embodiment, the pressure storage container unit 23 has a first pressure storage container 231, a second pressure storage container 232, and a third pressure storage container unit 233. The pressure storage containers 231 to 233 store the hydrogen supplied from the compressor unit 21. The pressure storage containers 231 to 233 are parallel connected to the compressor unit 21. The pressure storage containers 231 to 233 send out the hydrogen to the dispenser 11. The pressure storage containers 231 to 233 have the same volume and design pressure.

On gas flow way parts 20 between the compressor unit 21 and the pressure storage containers 231 to 233 provided are first valves V11, V21, and V31, respectively. On gas flow way parts 20 between the pressure storage containers 231 to 233 and the dispenser 11 further provided are second valves V12, V22, and V32, respectively. Also, on the part of the gas flow way 20 that is between the second valves V12, V22, V32 and the dispenser 11 is provided a flow rate adjusting valve 28 for adjusting a flow rate of the hydrogen to flow to the dispenser 11.

The precooling system 24 includes a cooler 3 and a brine circuit 5. The brine circuit 5 has a brine flow way 240, a brine pump 241, and a precooling heat exchanger 242 of a microchannel type. The brine circuit 5 may be provided with an unillustrated brine tank for storing brine. The brine flow way 240 holds brine, and the brine pump 241, the precooling heat exchanger 242 (another heat exchanger), and a part of the cooler 3 are arranged thereon.

In the brine circuit 5, the hydrogen is cooled by heat exchange with the brine in the precooling heat exchanger 242 shortly before being fed from the dispenser 11 to a tank 9a of the vehicle 9. The brine having taken heat from the hydrogen in the precooling heat exchanger 242 flows to the cooler 3, and then is cooled therein. The cooled brine is sent back to the precooling heat exchanger 242 by the brine pump 241.

The dispenser 11 has a coupler 12 which is detachably connected to a tank 9a of the vehicle 9 which is a tank carrier, and a flowmeter 13 for detecting a flow rate of the hydrogen. The dispenser 11 feeds the hydrogen sent out from the pressure storage containers 231 to 233 to the tank 9a of the vehicle 9 via the coupler 12. When a detection of the flowmeter 13 is equal to a reference value or lower, the dispenser 11 sends a signal representing the detection to the controller 29.

The controller 29 controls the operation of the driving part 211 of the compressor unit 21, and the opening and closing of the first valves V11, V21, V31 and the second valves V12, V22, V32. The control of the driving part 211 allows the compressor unit 21 to supply hydrogen to the pressure storage containers 231 to 233 at a predetermined flow rate. The first valves V11, V21, V31 are controlled to shift the connection between the pressure storage containers 231 to 233 and the compressor unit 21. The second valves V12, V22, V32 are controlled to shift the connection between the pressure storage containers 231 to 233 and the dispenser 11. The control of the execution of the compressor unit 21, and the opening and closing of the first valves V11, V21, V31 and the second valves V12, V22, V32 (i.e., the supply and sending of hydrogen to and out of the pressure storage container unit 23) achieves a storing operation that the pressure storage unit 23 stores hydrogen, and a sending operation that the hydrogen is sent out to the dispenser 11 (details will be described later).

Hereinafter, a sequence of a continuous hydrogen delivery to a plurality of vehicles 9 by the hydrogen station 2 will be described. It should be noted here that the word "continuous" means that a time between the finish of a hydrogen delivery to one vehicle 9 and the arrival of a subsequent vehicle 9 at the hydrogen station 2 is not greater than a time required to restore all the used pressure storage containers 231 to 233 to have a predetermined pressure (hereinafter, referred to as "reference pressure β3") or greater.

First, before the start of a delivery to a first vehicle 9, each of the pressure storage containers 231 to 233 has the reference pressure β3 or greater. The reference pressure β3 is greater than a pressure of the tank 9a of the vehicle 9 that is in a fully filled state. When the first vehicle 9 arrives at the hydrogen station 2, and the coupler 12 is connected to the tank 9a of the vehicle 9, the controller 29 opens the second valve 12 (step 11). The first pressure storage container 231 sends out the hydrogen to the dispenser 11, and the dispenser 11 feeds the hydrogen to the tank 9a of the vehicle 9. In this case, the other first valves V11, V21, V31 and second valves V22, V32 are kept closed.

Figure 2:
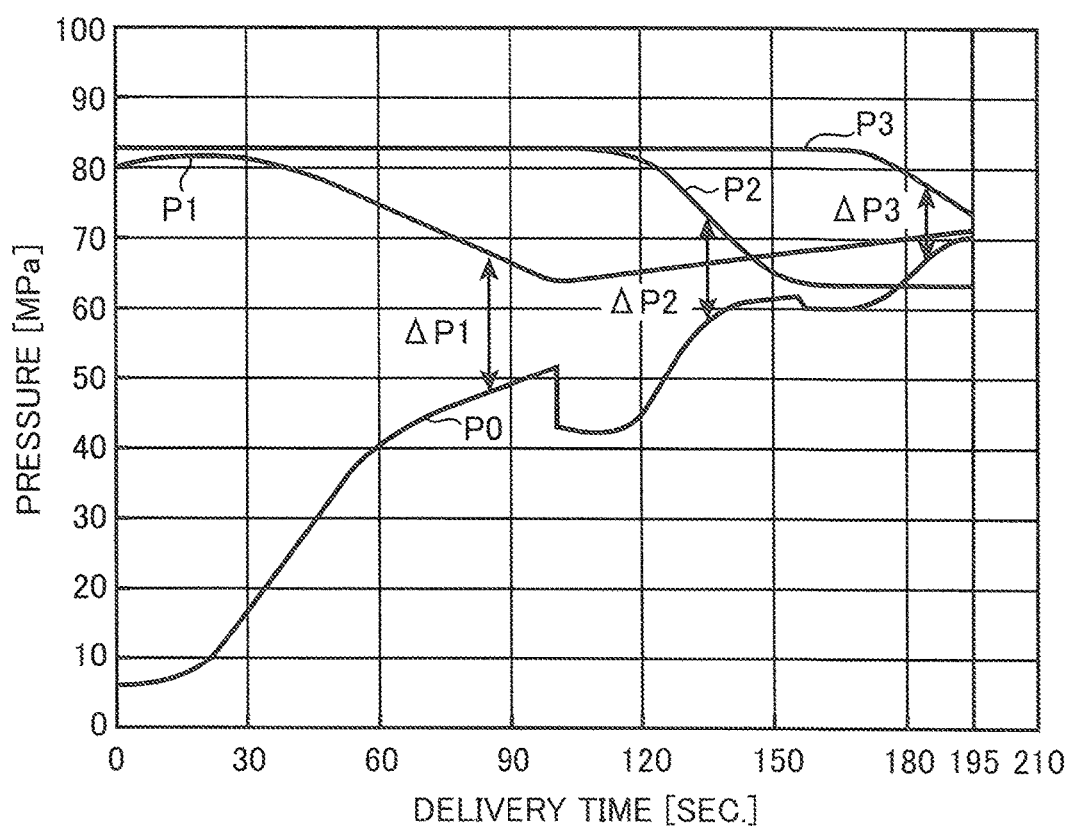
FIG. 2 shows a relationship between a delivery time, and a pressure of each pressure storage container and a pressure of a tank in the course of shifting one after another.

FIG. 2 shows a result of a simulation concerning a pressure change in each of the pressure storage containers 231 to 233 and a pressure change in the tank 9a of the vehicle 9 during the hydrogen delivery. In FIG. 2, indicated at P1 is a pressure of the first pressure storage container 231, P2 is a pressure of the second pressure storage container 232, P3 is a pressure of the third pressure storage container 233, and P0 is a pressure of the tank 9a. The pressure P0 of the tank 9a is detected by a pressure sensor 44 provided on the coupler 12. It is seen that the pressure P1 of the first pressure storage container 231 lowers to approximately 64 MPa due to the sending of the hydrogen from the first pressure storage container 231 to the dispenser 11. To the contrary, the pressure of the tank 9a rises to approximately 52 MPa.

When a first pressure difference ΔP1 (=P1−P0) between the pressure P1 of the first pressure storage container 231 and the pressure P0 of the tank 9a lowers to a predetermined value (approximately 12 MPa in the simulation), the controller 29 receives from the dispenser 11 an indication of shifting the pressure storage containers (step S12). The controller 29 closes the second valve V12 and opens the second valve V22 (step S13) shown in FIG. 1. Consequently, the connection to the dispenser 11 is shifted from the first pressure storage container 231 to the second pressure storage container 232. The shifting operation makes it possible to restore the pressure difference between the tank 9a of the vehicle 9 and the pressure storage container unit 23, and prevent lowering in the flow rate of the hydrogen.

As shown in FIG. 2, the pressure P2 of the second pressure storage container 232 lowers to approximately 64 MPa due to the sending of the hydrogen from the second pressure storage container 232 to the dispenser 11. To the contrary, the pressure of the tank 9a rises to approximately 63 MPa. When a second pressure difference ΔP2 (=P2−P0) between the pressure P2 of the second pressure storage container 232 and the pressure P0 of the tank 9a lowers to a predetermined value (approximately 1 MPa in the simulation), the controller 29 receives from the dispenser 11 an indication of shifting the pressure storage containers (step S14). The controller 29 closes the second valve V22 and opens the second valve V32 (step S15). Consequently, the sending of the hydrogen to the dispenser 11 is shifted from the second pressure storage container 232 to the third pressure storage container 233.

The pressure P3 of the third pressure storage container 233 lowers to approximately 74 MPa due to the sending of the hydrogen from the third pressure storage container 233 to the dispenser 11. To the contrary, the pressure of the tank 9a rises to approximately 72 MPa which is a predetermined value. When receiving a completion indication from the dispenser 11 (step S16), the controller 29 closes the second valve V32 (step S17) to stop the hydrogen delivery to the vehicle 9. In the simulation shown in FIG. 2, the pressure P0 of the tank 9a reaches approximately 72 MPa in 195 seconds from the start of the sending of the hydrogen from the first pressure storage container 231 to the dispenser 1.

As described above, in the hydrogen station 2, the first pressure storage container 231 is used in a low pressure region (0 MPa to approximately 52 MPa in this embodiment) of the tank 9a of the vehicle 9, and the second pressure storage container 232 is used in a medium pressure region (approximately 52 MPa to 63 MPa), and the third pressure storage container 233 is used in a high pressure region (approximately 63 MPa to 72 MPa). Thus, even if the pressure of the tank 9a of the vehicle 9 rises, this configuration can ensure the pressure difference between the pressure storage container unit 23 and the tank 9a to enable the dispenser 11 to efficiently feed the hydrogen to the tank 9a. Hereinafter, a pressure storage container for use in the low pressure region of the tank 9a, another pressure storage container for use in the medium pressure region thereof, and further another pressure storage container for use in the high pressure region thereof in the hydrogen feeding to the tank 9a will be respectively referred to as "low pressure region-pressure storage container", "medium pressure region-pressure storage container", and "high pressure region-pressure storage container" as well.

Figure 4:
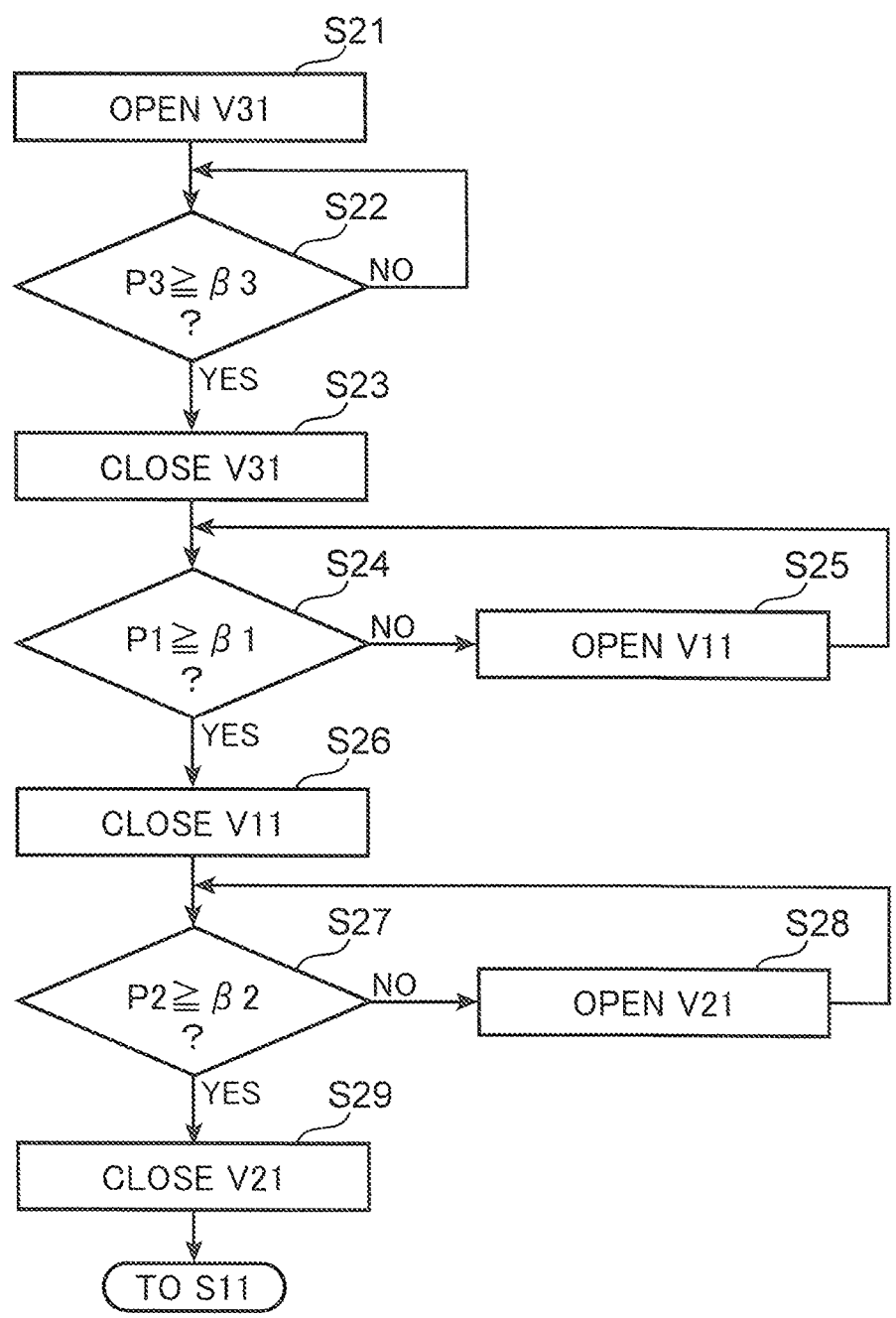
FIG. 4 shows steps of a storing operation and a sending operation which are implemented by the controller.

FIG. 4 is a flow chart of the storing operation and the sending operation. The controller 29 implements the storing operation in a time from the finish of the hydrogen delivery to the first vehicle 9 to an arrival of a second vehicle 9 at the hydrogen station 2. Specifically, first, the first valve V31 is opened (step S21) to allow the third pressure storage container 233 for use in the high pressure region to store the hydrogen supplied thereto from the compressor unit 21. The other values V11, V21, V12, V22, and V32 are kept closed.

Next, the pressure P3 of the third pressure storage container 233 is detected by a pressure sensor 43 lying between the third pressure storage container 233 and the valves V31, V32, and the detection is determined whether or not to be less than the reference pressure β33 (step S22). When the pressure P3 is less than the reference pressure β3, the first valve V31 is kept open. When the pressure P3 reaches the reference pressure β3 or greater (YES in step S22), the first valve V31 is closed (step S23).

Subsequently, the controller 29 determines whether or not the pressure P1 of the first pressure storage container 231 is not less than a first set pressure β1 (step S24) which is set in advance. The first set pressure β1 is necessary for the low pressure region-pressure storage container to be firstly used (i.e., a pressure necessary to start the feeding of the hydrogen to the tank 9a) at the hydrogen feeding to the tank 9a, the first set pressure β1 being less than the reference pressure β3 and less than the design pressure of the first pressure storage container 231. The pressure P1 of the first pressure storage container 231 is detected by a pressure sensor 41 lying between the first pressure storage container 231 and the valves V11, V12 on the gas flow way 20.

When the pressure P1 of the first pressure storage container 231 is less than the first set pressure β1 (NO in step S24), the controller 29 opens the first valve V11 (step S25) to allow the first pressure storage container 231 to store the hydrogen supplied thereto from the compressor unit 21. When the pressure P1 of the first pressure storage container 231 reaches the first set pressure β1 or greater and less than the reference pressure β3 (YES in step 24), the controller 29 closes the first valve V11 (step S26).

Subsequently, the controller 29 determines whether or not the pressure P2 of the second pressure storage container 232 is not less than a second set pressure β2 which is set in advance (step S27). The second set pressure β2 is necessary for the medium pressure region-pressure storage container to be subsequently used at the feeding of the hydrogen to the tank 9a, the second set pressure β2 being greater than the first set pressure β1 and less than the reference pressure β3. Moreover, the second set pressure β2 is set at a value less than the design pressure of the second pressure storage container 232. The pressure P2 of the second pressure storage container 232 is detected by a pressure sensor 42 lying between the second pressure storage container 232 and the valves V21, V22.

When the pressure P2 of the second pressure storage container 232 is less than the second set pressure β2 (NO in step S27), the controller 29 opens the first valve V21 (step S28) to allow the second pressure storage container 232 to store the hydrogen supplied thereto from the compressor unit 21. The operation returns to step S27, and when the pressure P2 of the second pressure storage container 232 is determined to be the second set pressure β2 or greater and less than the reference pressure β3 (YES in step 27), the controller 29 closes the first valve V21 (step S29). It should be noted here that steps S21 to S23 are appreciated to be performed simultaneously with steps S24 to S29 or after these steps.

The storing operation is completed by performing the above-described sequence of steps. When a second vehicle 9 arrives at the hydrogen station 2, the sending operation that the hydrogen is sent out from the pressure storage unit 23 to the dispenser 11 is implemented. In this case, first, the second valve V12 is opened to allow the first pressure storage container 231 to send out the hydrogen to the dispenser 11. When the pressure difference between the pressure P1 of the first pressure storage container 231 and the pressure P0 of the tank 9a lowers to a predetermined value, the controller 29 having received an indication of shifting the pressure storage containers closes the second valve V12 and opens the second valve V22 (steps S12, S13).

The pressure of the tank 9a further rises due to the sending of the hydrogen from the second pressure storage container 232 to the dispenser 11. When the pressure difference between the pressure P2 of the second pressure storage container 232 and the pressure P0 of the tank 9a lowers to a predetermined value, the controller 29 having received another shift indication closes the second valve V22 and opens the second valve V32 (step S14, S15).

The pressure of the tank 9a rises to the predetermined value due to the sending of the hydrogen from the third pressure storage container 233 to the dispenser 11. When receiving a completion indication from the dispenser 11 (step S16), the controller 29 closes the second valve 32 (step S17) and stops the hydrogen delivery to the second vehicle 9.

As described above, in the storing operation, the third pressure storage container 233 is supplied with the hydrogen until the pressure of the third pressure storage container 233 reaches the reference pressure or greater, after the finish of the delivery of the hydrogen to the first vehicle 9. Furthermore, in the sending operation, the hydrogen is sent out from the first pressure storage container 231 and the second pressure storage container 232 to the dispenser 11, and then sent out from the third pressure storage container 233 to the dispenser 11 on receipt of a shift indication from the dispenser 11, at the delivery of the hydrogen to the second vehicle 9.

Figure 5:
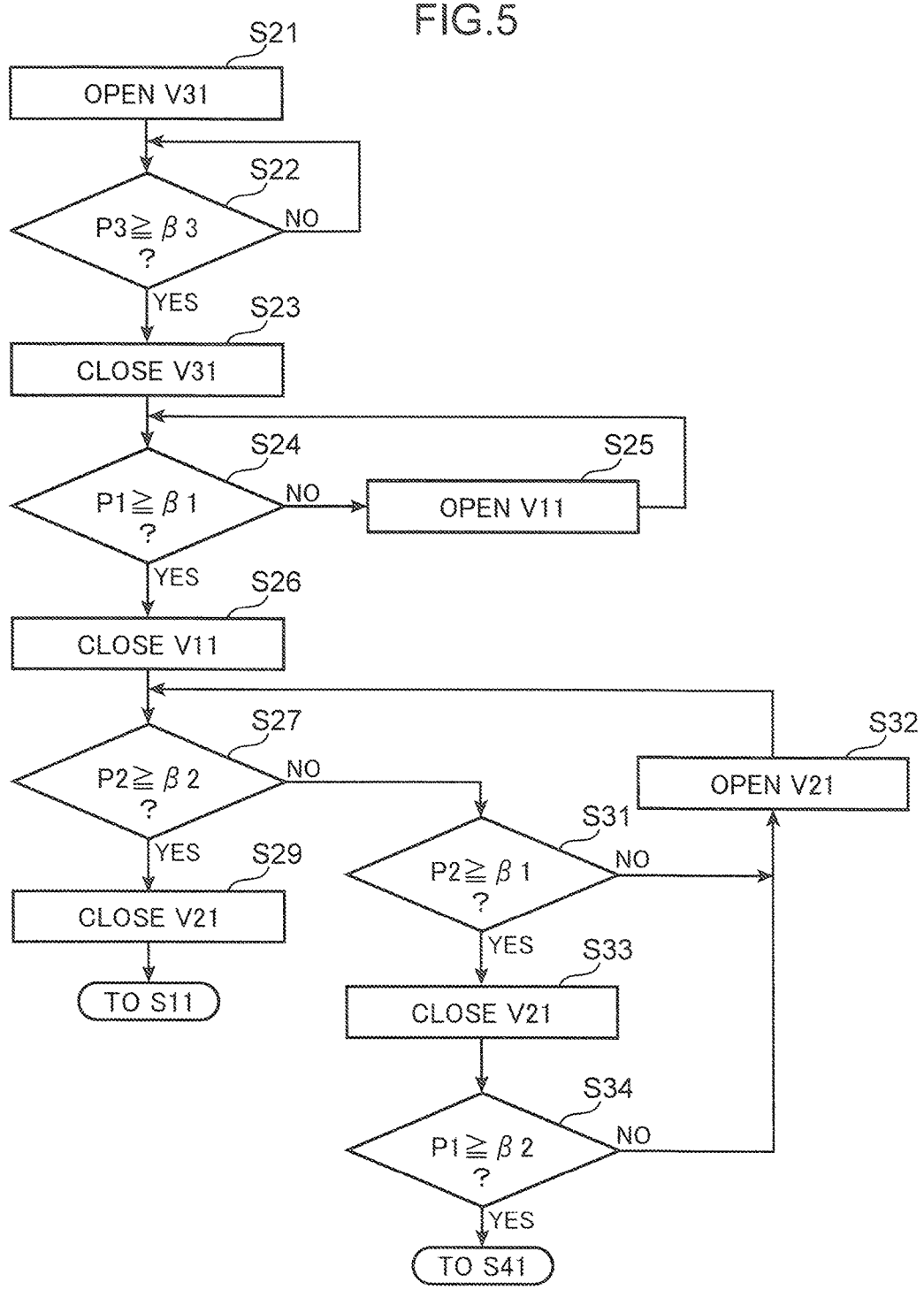
FIG. 5 shows steps of another storing operation and another sending operation which are implemented by the controller.

Subsequently, an operation of the hydrogen station 2 at which a third vehicle 9 arrives will be described with reference to FIGS. 5 and 6. The controller 29 implements the storing operation shown in FIG. 5 in a time from the finish of the hydrogen delivery to the second vehicle 9 to the arrival of the third vehicle 9 at the hydrogen station 2. Steps S21 to S27, S29 of FIG. 5 are the same as steps S21 to S27, S29 of FIG. 4, and steps S31 to S34 of FIG. 5 are performed in place of step S28 of FIG. 4.

First, in the same manner as the sequence of steps S21 to S23 shown in FIG. 4, the third pressure storage container 233 stores the hydrogen. Next, the controller 29 determines whether or not the pressure P1 of the first pressure storage container 231 is the first set pressure β1 or greater (step S24), and then opens the first valve 11 (step S25) to allow the first pressure storage container 231 to store the hydrogen when the pressure P1 is less than the first set pressure β1. When the pressure P1 of the first pressure storage container 231 reaches the first set pressure β1 or greater and less than the reference pressure β3, the first valve V11 is closed (steps S24, S26).

Figure 3:
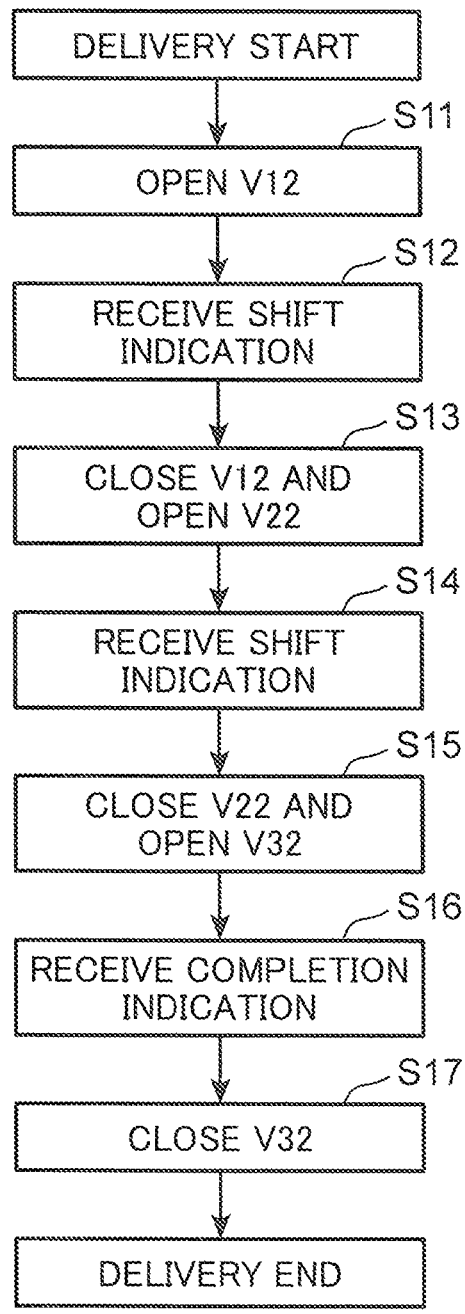
FIG. 3 shows steps of a shifting operation implemented by a controller.

The controller 29 determines whether or not the pressure P2 of the second pressure storage container 232 is the second set pressure β2 or greater (step S27). When the pressure P2 of the second pressure storage container 232 is the second set pressure β2 or greater (YES in step S27), the controller 29 closes the first valve V21 (step S29). Further, in the hydrogen station 2, the hydrogen is sent out to the dispenser 11 in an order of the first pressure storage container 231, the second pressure storage container 232, and the third pressure storage container 233, and then is delivered to the third vehicle 9 (see FIG. 3).

When the pressure P2 of the second pressure storage container 232 is less than the second set pressure β2 (NO in step S27), that is, when the second pressure storage container 232 is unavailable as the medium pressure region-pressure storage container, the below-described control is executed.

The controller 29 determines whether or not the pressure P2 of the second pressure storage container 232 is the first set pressure β1 or greater (step S31). When the pressure P2 of the second pressure storage container 232 is less than the first set pressure β1 (NO in step S31), the controller 29 opens the first valve V21 (step S32) and keeps the opened state until the pressure P2 of the second pressure storage container 232 reaches the second set pressure β2 or greater and less than the reference pressure β3. When the pressure of the second pressure storage container 232 reaches the second set pressure β2 or greater, the first valve 21 is closed (steps S27, S29). As a result, the second pressure storage container 232 is available as the medium pressure region-pressure storage container. In this configuration, the hydrogen is sent out to the dispenser 11 in the order of the first pressure storage container 231, the second pressure storage container 232, and the third pressure storage container 233.

Furthermore, when the pressure P2 of the second pressure storage container 232 is the first set pressure β1 or greater (YES in step S31), the controller 29 closes the first valve V21 (step S33). Here, it should be noted that step S33 is eliminated if the first valve V21 is already in the closed state. Then, the controller 29 determines whether or not the pressure P1 of the first pressure storage container 231 is the second set pressure β2 or greater (step S34).

Figure 6:
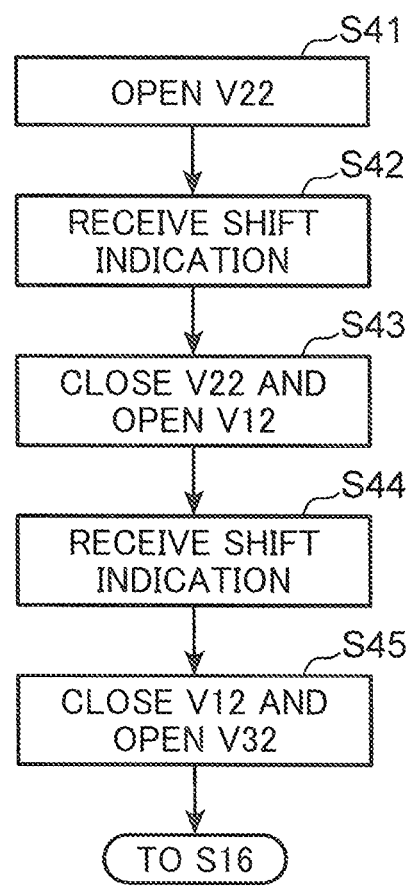
FIG. 6 shows steps of another sending operation implemented by the controller.

When the pressure P1 of the first pressure storage container 231 is the second set pressure β2 or greater (YES in step S34), the controller 29 opens the second valve V22 (step S41) as shown in FIG. 6 to first start the hydrogen delivery from the second pressure storage container 232 to the vehicle 9. Subsequently, the controller 29 having received a shift indication from the dispenser 11 closes the second valve V22, and opens the second valve V12 (steps S42, S43) to allow the first pressure storage container 231 to send out the hydrogen to the dispenser 11. The controller 29 having received another shift indication from the dispenser 11 closes the second valve V12, and opens the second valve V32 (steps S44, S45) to allow the third pressure storage container 233 to send out the hydrogen to the dispenser 11.

In this manner, the hydrogen is sent out to the dispenser 11 in the order of the second pressure storage container 232, the first pressure storage container 231 and the third pressure storage container 233 when the pressure of the first pressure storage container 231 is the second set pressure or greater and the pressure of the second pressure storage container 232 is the first set pressure or greater and less than the second set pressure, at the delivery of the hydrogen to the third vehicle 9. In a case that the first pressure storage container 231 and the second pressure storage container 232 are respectively available as the medium pressure region-pressure storage container and the low pressure region-pressure storage container, a configuration where the shift order of the first pressure storage container 231 and the second pressure storage container 232 can be changed can remarkably shorten the restoring time, compared with a configuration where the shift order of pressure storage containers cannot be changed.

When the pressure P1 of the first pressure storage container 231 is less than the second set pressure β2 in step S34 of FIG. 5, the first pressure storage container 231 is unavailable as the medium pressure region-pressure storage container. Thus, the first valve V21 is opened (step S32) to allow the second pressure storage container 232 to have the second set pressure β2 or greater and less than the reference pressure β3. In the hydrogen station 2, the hydrogen is sent out to the dispenser 11 in the order of the first pressure storage container 231, the second pressure storage container 232, and the third pressure storage container 233, and is delivered to the third vehicle 9 (see FIG. 3).

Heretofore, the configuration and the operation of the hydrogen station 2 according to the embodiment is described. However, the third pressure storage container 233 which is used as the high pressure region-pressure storage container has the smaller pressure difference from the tank 9a of the vehicle 9. Therefore, even small lowering in the pressure in the third pressure storage container 233 results in a difficulty in ensuring the sufficient flow rate. Hence, in the hydrogen station 2, a specified pressure storage container (i.e., the third pressure storage container 233) among the plurality of pressure storage containers 231 to 233 is supplied with hydrogen until the pressure of the specified pressure storage container reaches the reference pressure or greater, after the finish of the delivery of the hydrogen to the first vehicle 9. In other words, the third pressure storage container 233 is continuously supplied with hydrogen until the pressure of the third pressure container 233 reaches the reference pressure or greater, and the other pressure storage containers 231, 232 than the third pressure storage container 233 are supplied with hydrogen while keeping less than the reference pressure. Then, the other pressure storage containers 231, 232 than the third pressure storage container 233 are allowed to send out the hydrogen to the dispenser 11, and the third pressure storage container 233 is allowed to send out the hydrogen to the dispenser 11 on receipt of the shift indication from the dispenser 11.

This configuration where the specified pressure storage container has the reference pressure or greater can shorten the time (restoring time) from the finish of the hydrogen delivery to the first vehicle 9 to the start of the hydrogen delivery to the second vehicle 9, compared with a configuration where all the pressure storage containers 231 to 233 are required to have the reference pressure or greater.

Moreover, in the hydrogen station 2, the sending operation of the hydrogen from the pressure storage container unit 23 to the dispenser 11 is implemented when the pressure of one of the other pressure storage containers than the third pressure storage container 233 is the first set pressure β1 or greater, and the pressure of the other pressure storage container is the second set pressure β2 or greater, the sending operation is implemented that the hydrogen is sent out from the pressure storage container unit 23 to the dispenser 11. This configuration can always ensure a constant pressure difference between the tank 9a and the pressure storage container unit 23 regardless of a pressure rise in the tank 9a of the vehicle 9, thereby further shortening the delivery time of hydrogen to the vehicle 9.

Moreover, in the hydrogen station 2, the first pressure storage container 231 is used as the medium pressure region-pressure storage container, and the second pressure storage container 232 is used as the low pressure region-pressure storage container under the condition that the pressure P1 of the first pressure storage container 231 is the second set pressure β2 or greater, and the pressure P2 of the second pressure storage container 232 is the first set pressure β1 or greater and less than the second set pressure β2, at the delivery of the hydrogen to the third vehicle 9. It is possible to deliver the hydrogen to the third vehicle 9 in a shorter time owing to the changeable shift order of the first and second pressure storage containers 231, 232 in accordance with the respective pressures remaining therein. It should be noted that, in the hydrogen station 2, a change in the shift order of the pressure storage containers is not limited to the third vehicle, and can be applied to the forth or further subsequent vehicles 9 when the above-described condition is satisfied.

In the delivery of the hydrogen to the vehicle 9, a fluctuation range of the pressure of the low pressure region-pressure storage container to be firstly used is likely to become greater than that of the pressure of the medium pressure region-pressure storage container to be subsequently used. In this case, if the shift order of the three pressure storage containers is unchangeable, the duration of the pressure storage container used as the low pressure region-pressure storage container is shorter than that of the pressure storage container used as the medium pressure region-pressure storage container. In contrast, in the hydrogen station 2, the respective durations of the first pressure storage container 231 and the second pressure storage container 232 can be equalized to each other owing to the changeable shift order of the first and the second pressure storage containers 231, 232 in accordance with the respective pressures remaining therein.

Figure 7:
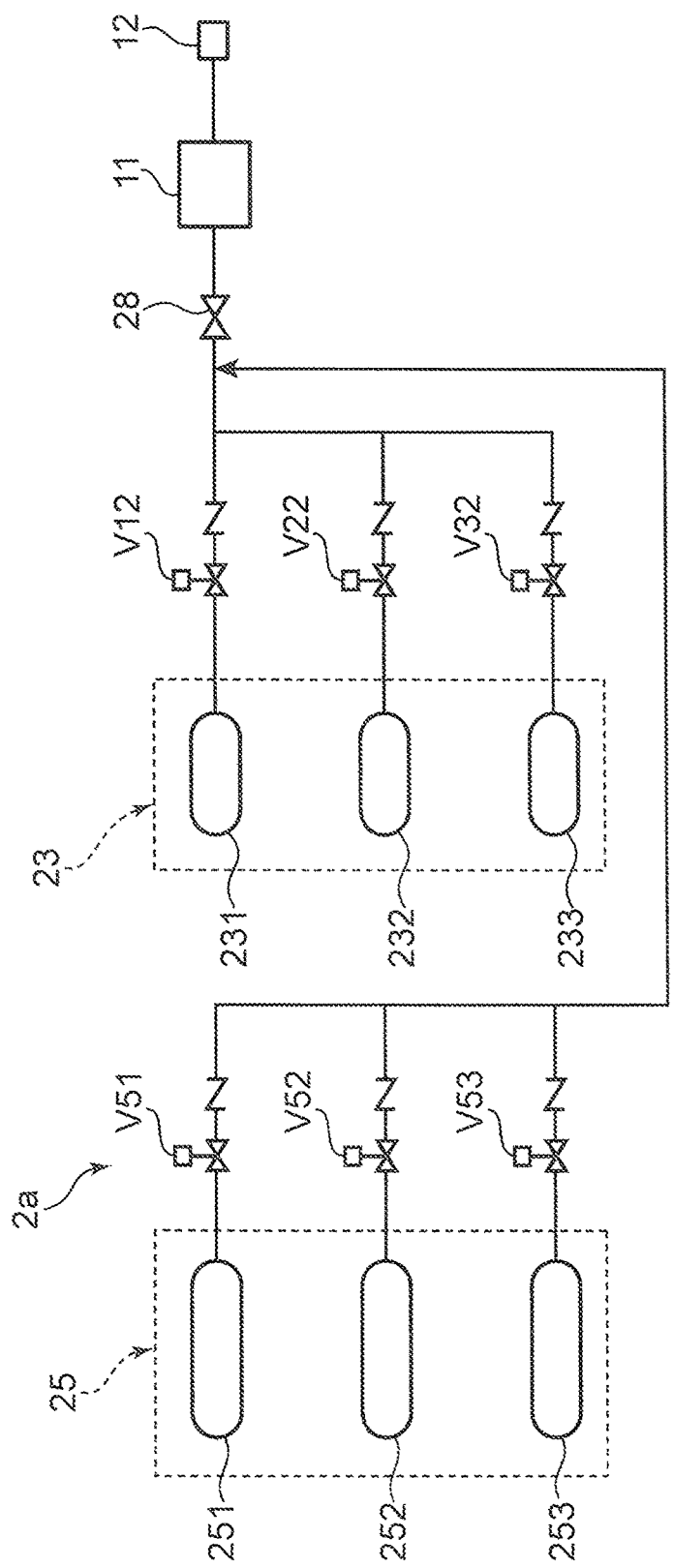
FIG. 7 shows a hydrogen station according to another embodiment.

FIG. 7 shows a hydrogen station 2a according to another embodiment. The hydrogen station 2a includes a second pressure storage container unit 25. Hereinafter, a pressure storage container unit 23 is referred to as "first storage container unit 23" in order to distinguish it from the second pressure storage container unit 25. Like the first pressure storage container unit 23, the second pressure storage container unit 25 has a first pressure storage container 251, a second pressure storage container 252, and a third pressure storage container 253. Second valves V51 to V53 are respectively provided between the first to third pressure storage containers 251 to 253 of the second pressure storage container 25 and a dispenser 11. In FIG. 7 are shown only the pressure storage container unit 23, the dispenser 11, and other primary components lying on a flow way which connects these components.

When hydrogen is delivered to a plurality of vehicles by the hydrogen station 2a, the hydrogen is sent out from the first pressure storage container unit 23 to the dispenser 11 for a first vehicle 9.

The hydrogen is sent out from the second pressure storage container unit 25 for a second vehicle 9 after the hydrogen gas delivery to a first vehicle 9 is finished. In parallel with the sending of the hydrogen from the second pressure storage container unit 25, the storing operation is performed to the third pressure storage container 233 of the first pressure storage container unit 23 to supply the hydrogen thereto until its pressure reaches a reference pressure or greater. Further, at the arrival of a third vehicle 9, the sending operation is implemented that the hydrogen is sent out from the first pressure storage container 231 and the second pressure storage container 232 to the dispenser 11, and then sent out from the third pressure storage container 233 to the dispenser 11 on receipt of a shift indication from the dispenser 11.

Moreover, the pressure storage container 253 of the second pressure storage container unit 25 is supplied with the hydrogen until its pressure reaches the reference pressure, simultaneously with the sending of the hydrogen by the first pressure storage container unit 23. At the arrival of a fourth vehicle 9, the hydrogen is sent out to the dispenser 11 in an order of the first pressure storage container 251, the second pressure storage container 252, and the third pressure storage container 253 of the second pressure storage container unit 25.

As described above, according to the hydrogen station 2a, the aforementioned storing operation is implemented in each of the first and second pressure storage container units 23, 25 after the finish of a hydrogen delivery to one vehicle 9, i.e., the first vehicle for the first pressure storage container unit 23 or the second vehicle for the second pressure storage container unit 25. Furthermore, at a hydrogen delivery to a subsequent vehicle 9, i.e., the third vehicle for the first pressure storage container unit 23 or the fourth vehicle for the pressure storage container unit 25, the aforementioned sending operation is implemented in the state that the pressure of the third pressure storage container 233, 253 is set at a reference pressure β3 or greater. In this way, it is possible to deliver the hydrogen to a plurality of vehicles 9 in a shorter time. Further, the hydrogen station 2a can perform the delivery in a much shorter time owing to the simultaneous implementation of sending the hydrogen from one of the pressure storage container units to the dispenser 11 and supplying the hydrogen to the other pressure storage container unit.

In the pressure storage container units 23, 25, when the pressure of the first pressure container 231, 251 is a second set pressure or greater, and the pressure of the second pressure storage container 232, 252 is the first set pressure or greater and less than the second set pressure in the hydrogen delivery to the vehicle 9, the hydrogen is appreciated to be sent out to the dispenser 11 in the order of the second pressure storage container 232, 252, the first pressure storage container 231, 251, and the third pressure storage container 233, 253.

Heretofore, the preferable embodiments of the present invention have been described. However, the present invention should not be limited to the embodiments, and may be changed to various modifications.

In the above-described embodiments, for example, the third pressure storage container 233 is used as the high pressure region-pressure storage container in the storing operation. However, other pressure storage container than the third pressure storage container 23 may be appreciated to be used as the high pressure region-pressure storage container. For example, if the pressure storage container 232 is used as the high pressure region-pressure storage container, the second pressure storage container 232 is supplied with the hydrogen until the pressure P2 of the second pressure storage container 232 reaches the reference pressure β3 or greater in the storing operation, and in the subsequent sending operation, the hydrogen delivery from other pressure storage container than the second pressure storage container 232 is started for the vehicle 9.

In one pressure storage container unit in the embodiments, it may be appreciated to simultaneously implement the sending of the hydrogen from one pressure storage container to the dispenser 11 and the storing of the hydrogen in another pressure storage container. For example, the controller 29 opens the second valve V22 and the first valve V11 at the same time to allow the first pressure storage container 231 to store the hydrogen, while allowing the second pressure storage container 232 to send out the hydrogen to the dispenser 11. This operation can shorten the restoring time at a reduced number of pressure storage container units. Moreover, it may be appreciated to implement the sending of the hydrogen from one pressure storage container to the dispenser 11, and the supply of the hydrogen to the one pressure storage container at the same time. This configuration can suppress a decrease in the amount of hydrogen in the one pressure storage container.

In the embodiments, the pressure storage container unit 23 may have two or not less than four pressure storage containers, other than three. The gas supply unit is not limited to the compressor unit 21. For example, a water electrolyzer may be used instead. Alternatively, a device for generating hydrogen from liquefied hydrogen may be used as the gas supply unit.

A plurality of dispensers 11 may be provided as the feeder. It may be appreciated to send out the hydrogen from a single pressure storage container unit 23 to the plurality of dispensers 11. In the hydrogen station 2a of the another embodiment, it may be appreciated to provide two (or more) dispensers 11 corresponding to the pressure storage container units 23, 25, which enables more efficient delivery of hydrogen to a plurality of vehicles 9 at the same time.

The hydrogen station 2 may be utilized for a hydrogen delivery to other tank carrier than the vehicle. The above-described way of delivering hydrogen to a vehicle 9 may be applied to another gas delivery system for supplying gas other than hydrogen.

The embodiments will be summarized.

According to the embodiment, a gas delivery system for delivering a gas to a tank carrier including a tank includes: a feeder for feeding the gas to the tank of the tank carrier; a pressure storage container unit which has a plurality of pressure storage containers for storing the gas, and sends out the gas to the feeder; a gas supply unit for supplying the gas to the pressure storage container unit; and a controller for controlling execution of the gas supply unit and the sending of the gas from the pressure storage container unit, wherein the controller implements a storing operation that a specified pressure storage container among the plurality of pressure storage containers is supplied with the gas until a pressure of the specified pressure storage container reaches a reference pressure or greater, after finish of a delivery of the gas to one tank carrier, and a sending operation that the gas is sent out from another pressure storage container except the specified pressure storage container to the feeder, and then sent out from the specified pressure storage container to the feeder after shifting from the another pressure storage container to the specified pressure storage container on receipt of a shift indication from the feeder, at a delivery of the gas to a subsequent tank carrier.

In the gas delivery system, the specified pressure storage container among the plurality of pressure storage containers is supplied with the gas until the pressure of the specified pressure storage container reaches the reference pressure or greater at the finish of the feeding of the gas to the tank of one tank carrier, such as a vehicle. Further, at the delivery of the gas to a subsequent tank carrier, the sending of the gas from another pressure storage container except the specified pressure storage container to the tank of the subsequent tank carrier is started, and then the gas is sent out from the specified pressure storage container after shifting to the specified pressure storage container when the gas pressure of the tank reaches the predetermined value or greater. This configuration where the pressure storage container to be used when the pressure of the tank becomes high has the reference pressure or greater can shorten the time, i.e., restoring time, from the finish of the gas delivery to one tank carrier to the start of the gas delivery to the subsequent tank carrier, compared with a case where all the pressure storage containers are required to restore the reference pressure or greater.

Moreover, according to another aspect of the embodiment, a gas delivery system for delivering a gas to a tank carrier including a tank includes: a feeder for feeding the gas to the tank of the tank carrier; a pressure storage container unit which has a plurality of pressure storage containers for storing the gas, and sends out the gas to the feeder; a gas supply unit for supplying the gas to the pressure storage container unit; and a controller for controlling execution of the gas supply unit and the sending of the gas from the pressure storage container unit, wherein the controller implements a storing operation that a specified pressure storage container among the plurality of pressure storage containers is supplied with the gas until a pressure of the specified pressure storage container reaches a reference pressure or greater, and the other pressure storage containers than the specified pressure storage container are supplied with the gas while keeping less than the reference pressure or greater, after finish of a delivery of the gas to one tank carrier, and a sending operation that the gas is sent out from another pressure storage container except the specified pressure storage container to the feeder, and then sent out from the specified pressure storage container to the feeder after shifting from the another pressure storage container to the specified pressure storage container on receipt of a shift indication from the feeder, at a delivery of the gas to a subsequent tank carrier.

The gas delivery system can shorten the gas delivery time to a plurality of tank carriers.

Specifically, it is preferred that the pressure storage container unit includes three pressure storage containers, one of the three pressure storage containers is the specified pressure storage container, and the controller allows, in the sending operation, the other two pressure storage containers than the specified pressure storage container to send out the gas to the feeder one after the other, and subsequently allows the specified pressure storage container to send out the gas to the feeder after shifting to the specified pressure storage container on receipt of a shift indication from the feeder.

In this case, it is preferred that the controller implements the sending operation when a pressure of one of the other pressure storage containers than the specified pressure storage container among the three pressure storage containers is not less than a first set pressure necessary to start a feeding of the gas to the tank, and a pressure of the other pressure storage container is not less than a second set pressure, the second set pressure being greater than the first set pressure, after the storing operation.

This configuration can always ensure a constant pressure difference between the tank and the pressure storage container unit regardless of a pressure rise in the tank of the tank carrier, thereby further shortening the delivery time of the hydrogen to the tank carrier.

Further in this case, it is preferred that the controller implements the storing operation after finish of the delivery of the gas to the subsequent tank carrier, and the controller implements the sending operation that the gas is sent out to the feeder in an order of the other pressure storage container, the one pressure storage container, and the specified pressure storage container when the pressure of the one pressure storage container is the second set pressure or greater and the pressure of the other pressure storage container is the first set pressure or greater and less than the second set pressure, at a delivery of the gas to a further subsequent tank.

This configuration can further shorten the restoring time, compared with the case where the shift order of the three pressure storage containers cannot be changed. For example, in a case that the shift order of the pressure storage containers is unchangeable, the gas delivery to the subsequent tank carrier will not be started when the pressure storage container to be subsequently used has less than the second set pressure, even if the pressure storage container to be subsequently used has the first set pressure or greater and the pressure storage container to be firstly used has the second set pressure or greater. In this case, the gas delivery to the subsequent tank carrier will be started after the pressure storage container to be subsequently used is supplied with the gas until the pressure of the pressure storage container to be subsequently used reaches the second set pressure or greater. In contrast, the present invention makes it possible to shorten the restoring time, since the gas delivery from the second pressure storage container to the subsequent tank carrier will be started without the gas storing in the second pressure storage container when the pressure of the first pressure storage container is the second set pressure or greater, and the pressure of the second pressure storage container is less than the second set pressure and the first set pressure or greater.

Moreover, in the delivery of the gas to the tank carrier, a fluctuation value of the pressure of the pressure storage container to be firstly used is likely to become greater than that of the pressure of the pressure storage container to be subsequently used. In this case, if the shift order of the three pressure storage containers is unchangeable, the duration of the pressure storage container to be firstly used is shorter than that of the pressure storage container to be subsequently used. In contrast, in the present invention, the respective durations of the first pressure storage container and the second pressure storage container can be equalized to each other owing to the changeable shift order of the first pressure storage container and the second pressure storage container when the pressure of the first pressure storage container is the second set pressure or greater, and the pressure of the second pressure storage container is less than the second set pressure and the first set pressure or greater.

Additionally, in the present invention, it is preferred that the controller implements the storing operation that the gas is supplied from the gas supply unit to one pressure storage container while implementing the sending operation that the gas is sent out from another pressure storage container to the feeder.

This configuration can further shorten the restoring time.

The invention claimed is:

1. A gas delivery system for delivering a gas to a tank carrier including a tank, comprising:
    a feeder for feeding the gas to the tank of the tank carrier;
    a pressure storage container unit which has a plurality of pressure storage containers for storing the gas, and sends out the gas to the feeder, each of the plurality of the pressure storage containers being configured to store the gas at a reference pressure or greater;
    a gas supply unit for supplying the gas to the pressure storage container unit; and
    a controller for controlling execution of the gas supply unit and the sending of the gas from the pressure storage container unit, wherein
    the controller implements
        a storing operation that a specified pressure storage container among the plurality of pressure storage containers is supplied with the gas until a pressure of the specified pressure storage container reaches a reference pressure or greater, and another pressure storage container which is not the specified pressure storage container is supplied with the gas until a pressure of said another pressure storage container reaches a pressure which is a set pressure or higher, and lower than the reference pressure when the pressure of said another pressure storage container is lower than the set pressure, after finish of a delivery of the gas to one tank carrier, and
        a sending operation that the gas is sent out from said another pressure storage container except the specified pressure storage container to the feeder, and then sent out from the specified pressure storage container to the feeder after shifting from the another pressure storage container to the specified pressure storage container on receipt of a shift indication from the feeder, at a delivery of the gas to a subsequent tank carrier.

2. A gas delivery system according to claim 1, wherein
in the storing operation, the another pressure storage container is supplied with the gas while keeping less than the reference pressure.

3. A gas delivery system according to claim 1, wherein
the pressure storage container unit includes three pressure storage containers,
one of the three pressure storage containers is the specified pressure storage container, and
the controller allows, in the sending operation, the other two pressure storage containers than the specified pressure storage container to send out the gas to the feeder one after the other, and subsequently allows the specified pressure storage container to send out the gas to the feeder after shifting to the specified pressure storage container on receipt of a shift indication from the feeder.

4. A gas delivery system according to claim 3,
the controller implements the sending operation when a pressure of one of the other pressure storage containers than the specified pressure storage container among the three pressure storage containers is not less than a first set pressure necessary to start a feeding of the gas to the tank, and a pressure of the other pressure storage container is not less than a second set pressure, the second set pressure being greater than the first set pressure, after the storing operation.

5. A gas delivery system according to claim 4, wherein
the controller implements the storing operation after the finish of the delivery of the gas to the subsequent tank carrier, and
the controller implements the sending operation that the gas is sent out to the feeder in an order of the other pressure storage container, the one pressure storage container, and the specified pressure storage container when the pressure of the one pressure storage container is the second set pressure or greater and the pressure of the other pressure storage container is the first set pressure or greater and less than the second set pressure, at a delivery of the gas to a further subsequent tank.

6. A gas delivery system according to claim 1, wherein
the controller implements the storing operation that the gas is supplied from the gas supply unit to one pressure storage container while implementing the sending operation that the gas is sent out from another pressure storage container to the feeder.

* * * * *